US008469334B2

(12) United States Patent
Yamagata et al.

(10) Patent No.: US 8,469,334 B2
(45) Date of Patent: Jun. 25, 2013

(54) SOLENOID ACTUATOR

(75) Inventors: Hideki Yamagata, Sagamihara (JP); Mamoru Hosogai, Sagamihara (JP); Hideki Tsuchiya, Sagamihara (JP); Yoshiharu Miya, Sagamihara (JP); Tomoyuki Fujita, Kani (JP); Koichiro Akatsuka, Gifu (JP); Kenji Yazaki, Kani (JP)

(73) Assignee: Kayaba Industry Co., Ltd., Tokyo (JP)

( * ) Notice: Subject to any disclaimer, the term of this patent is extended or adjusted under 35 U.S.C. 154(b) by 342 days.

(21) Appl. No.: 12/588,912

(22) Filed: Nov. 2, 2009

(65) Prior Publication Data

US 2010/0111727 A1 May 6, 2010

(30) Foreign Application Priority Data

Nov. 6, 2008 (JP) ................................ 2008-285371
Nov. 26, 2008 (JP) ................................ 2008-301111

(51) Int. Cl.
*F16K 31/02* (2006.01)
*H01F 3/00* (2006.01)
*H01F 5/00* (2006.01)

(52) U.S. Cl.
USPC .................. 251/129.15; 251/129.07; 335/260

(58) Field of Classification Search
USPC ................. 251/129.07, 129.15, 355; 335/260
See application file for complete search history.

(56) References Cited

U.S. PATENT DOCUMENTS

| | | | | |
|---|---|---|---|---|
| 4,102,526 | A * | 7/1978 | Hargraves | 251/129.21 |
| 5,856,771 | A | 1/1999 | Nippert | |
| 5,918,635 | A * | 7/1999 | Wang et al. | 137/625.65 |
| 6,386,220 | B1 * | 5/2002 | Koenings | 137/15.21 |
| 6,418,967 | B1 * | 7/2002 | Frei et al. | 137/625.65 |
| 6,679,475 | B2 * | 1/2004 | Rembold et al. | 251/129.14 |
| 7,973,627 | B2 * | 7/2011 | Yamagata et al. | 335/255 |
| 8,081,053 | B2 * | 12/2011 | Yamagata et al. | 335/260 |
| 2003/0136931 | A1 * | 7/2003 | Watanabe et al. | 251/129.15 |
| 2004/0113730 | A1 | 6/2004 | Watanabe et al. | |
| 2005/0218363 | A1 | 10/2005 | Furuta et al. | |
| 2009/0050829 | A1 * | 2/2009 | Haynes et al. | 251/129.02 |

FOREIGN PATENT DOCUMENTS

| | | |
|---|---|---|
| JP | 53-324 | 1/1978 |
| JP | 61-44811 | 3/1986 |
| JP | 61-131576 | 8/1986 |
| JP | 2-31769 | 2/1990 |
| JP | 6-74357 | 3/1994 |
| JP | 7-27112 | 5/1995 |
| JP | 11-031617 A | 2/1999 |

(Continued)

*Primary Examiner* — John K Fristoe, Jr.
*Assistant Examiner* — Daphne M Barry
(74) *Attorney, Agent, or Firm* — Rabin & Berdo, P.C.

(57) ABSTRACT

A solenoid actuator (1) attached to hydraulic equipment comprises a shaft (5) connected to the hydraulic equipment, a plunger (4) fixed to the shaft (5), a coil (12) which magnetically drives the plunger (4), and a first bearing (7) and a second bearing (8) supporting the shaft (5) on either sides of the plunger (4). A plunger front chamber (74) is formed between the first bearing (7) and the plunger (4), and a plunger rear chamber (75) is formed between the plunger (4) and the second bearing (8). By providing a plunger exterior oil passage (63) on the outside of the plunger (4) to connect the plunger front chamber (74) to the plunger rear chamber (75), working oil flows through the plunger exterior oil passage (63) every time the plunger (4) strokes, thereby preventing a deposit of contaminant on the plunger (4) without increasing a stroke resistance of the plunger (4).

7 Claims, 4 Drawing Sheets

FOREIGN PATENT DOCUMENTS

| | | | | | |
|---|---|---|---|---|---|
| JP | 2000-136888 | | 5/2000 | | |
| JP | 2000-146003 | | 5/2000 | | |
| JP | 2001-41339 | | 2/2001 | | |
| JP | 2001-317653 | A | 11/2001 | | |
| JP | 2006-064076 | A | 3/2006 | | |
| JP | 2008-89080 | | 4/2008 | | |
| JP | 2008292296 | A | * 12/2008 | .................... | 335/260 |
| WO | WO 2009/157841 | A1 | 12/2009 | | |

* cited by examiner

SOLENOID ACTUATOR

FIELD OF THE INVENTION

This invention relates to a solenoid actuator which drives a shaft axially using a magnetic force created by a solenoid.

BACKGROUND OF THE INVENTION

A solenoid actuator for driving hydraulic equipment such as a valve is constituted, for example, by the following members.

Specifically, two cylindrical magnetic path forming members made respectively in a cylindrical form are arranged coaxially with a gap provided there-between in an axial direction, and a plunger made of a magnetic material is disposed on the inside of the magnetic path forming members. A coil provided on the outside of the magnetic path forming members is energized to form a magnetic path through the magnetic path forming members. According to this arrangement, magnetic flux transfer between the two magnetic path forming members is performed via the plunger such that the plunger is driven in the axial direction by a magnetic force, and a shaft fixed to the plunger performs a linear motion.

Working oil in the hydraulic equipment is introduced into the solenoid actuator to lubricate bearings supporting the shaft which performs a linear motion and obtain a preferable balance of pressures acting on the bearings in the axial direction.

However, when working oil containing a contaminant such as abrasion powder generated in the hydraulic equipment is introduced into the solenoid actuator, the contaminant tends to be deposited in a strong magnetic field portion of the actuator. The contaminant deposited in the strong magnetic field portion adversely affects the operation of the solenoid actuator by weakening a thrust which the solenoid exerts on the shaft or increasing a sliding resistance of the shaft with respect to the bearings.

To prevent the contaminant from depositing in the strong magnetic field portion, JP2006-064076A, issued by the Japan Patent Office in 2006, proposes an annular member which allows the shaft to be free to slide while blocking working oil flowing from the hydraulic equipment from invading a plunger chamber formed between the bearings.

For the same purpose, JPH11-031617A, issued by the Japan Patent Office in 1999, proposes a ring filter facing the plunger chamber so as to be penetrated by the shaft, and a contaminant pool formed on the opposite side of the ring filter to the plunger chamber.

SUMMARY OF THE INVENTION

However, the above annular member and ring filter are likely to come into contact with the shaft, causing a sliding resistance of the shaft to increase. As a result, the response of the solenoid actuator may be affected adversely.

It is therefore an object of this invention to prevent deposits of a contaminant in the strong magnetic field portion without increasing the sliding resistance of the shaft.

To achieve the above object, this invention provides a solenoid actuator attached to hydraulic equipment, comprising a shaft connected to the hydraulic equipment, the shaft having a center axis, a plunger made of a magnetic material and fixed to the shaft, a coil which magnetically drives the plunger in a direction of the center axis, and a first bearing and a second bearing which support the shaft.

The first bearing and the second bearing are located on either side of the plunger in the direction of the center axis such that the first bearing is nearer to the hydraulic equipment than the second bearing.

The solenoid actuator further comprises a plunger front chamber formed between the first bearing and the plunger, a plunger rear chamber formed between the plunger and the second bearing, a plunger exterior oil passage formed on the outside of the plunger to connect the plunger front chamber to the plunger rear chamber, and a communication passage connecting the hydraulic equipment to one of the plunger front chamber and the plunger rear chamber.

The details as well as other features and advantages of this invention are set forth in the remainder of the specification and are shown in the accompanying drawings.

DESCRIPTION OF THE PREFERRED EMBODIMENTS

Figure 2:
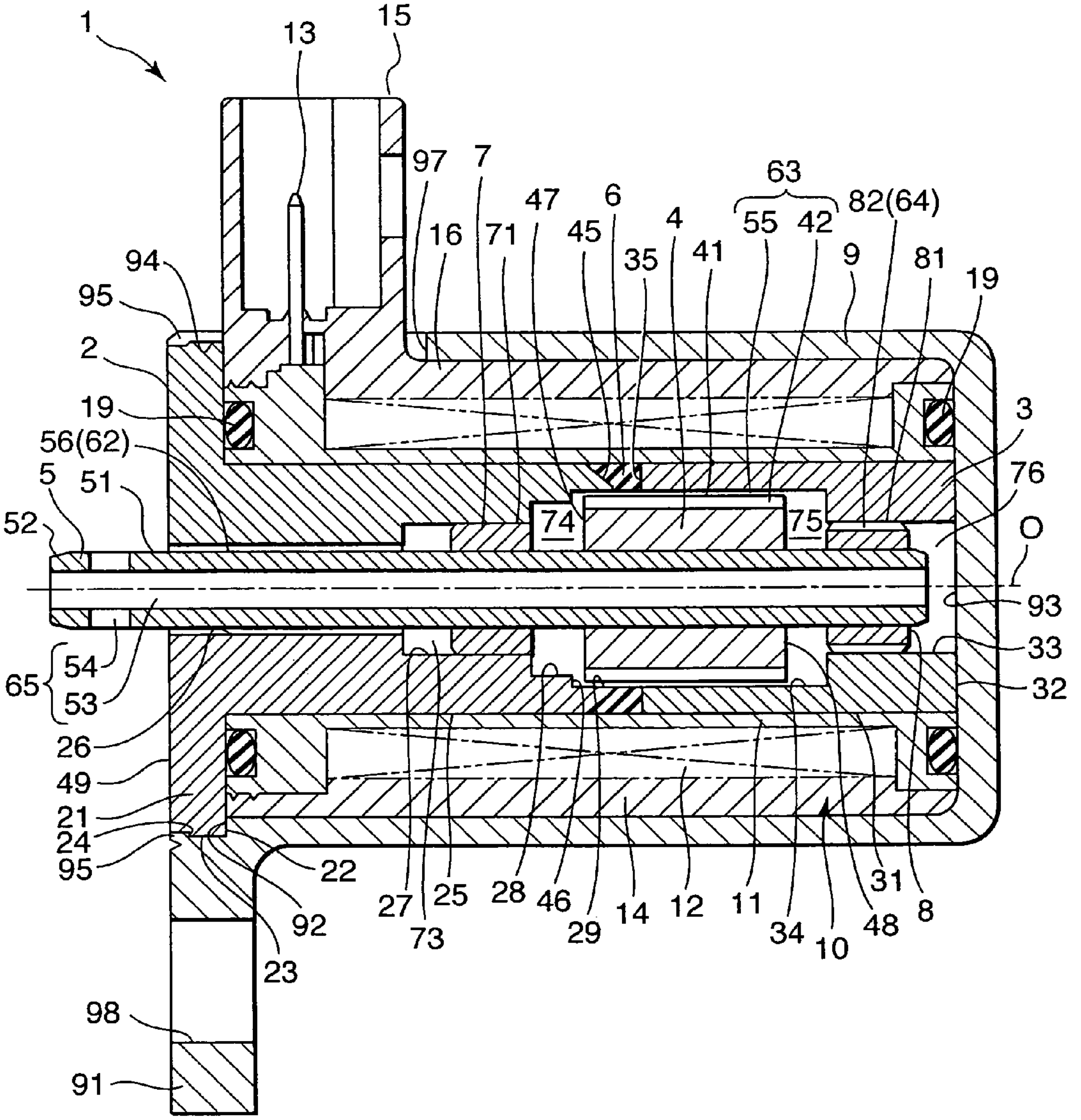
FIG. 2 is a sectional view of the solenoid actuator taken along a line II-O-II in FIG. 1.

Referring to FIG. 2 of the drawings, a solenoid actuator 1 according to this invention is configured to exert a magnetic force on a plunger 4 using a solenoid assembly 10 housed in a case 9, thereby driving a shaft 5 fixed to the plunger 4 in a direction of a center axis O.

Figure 1:
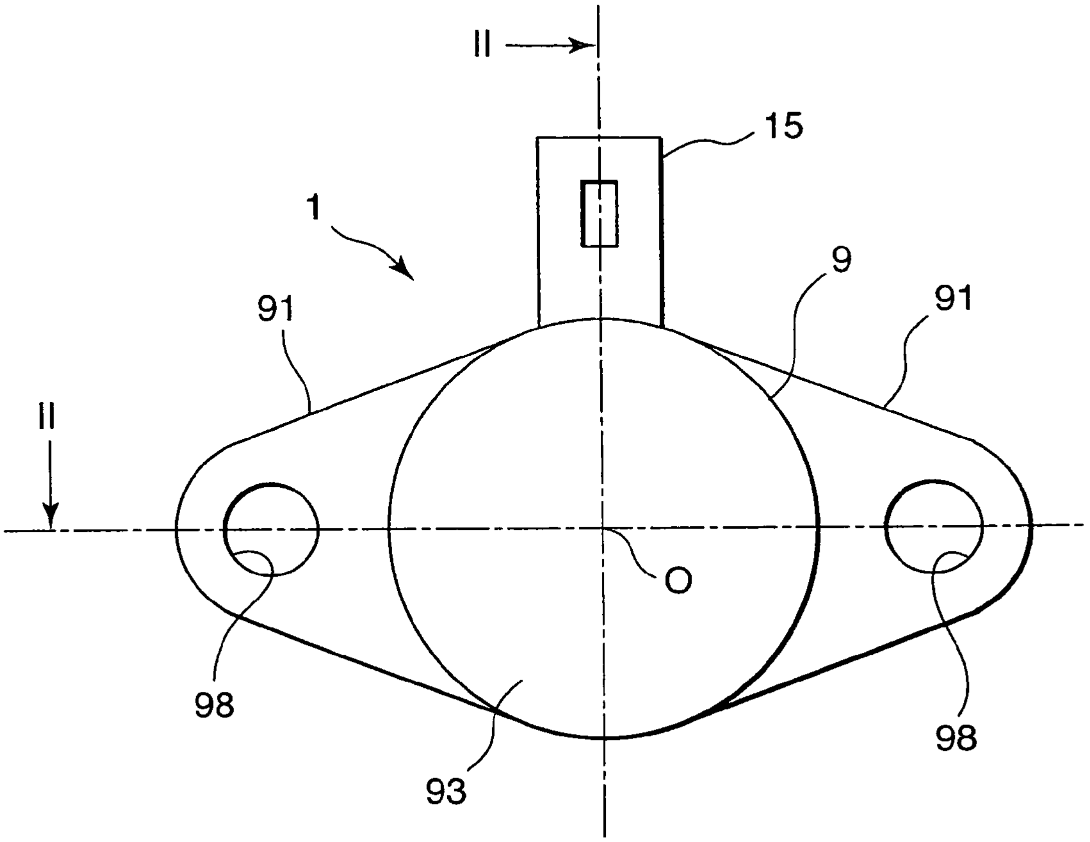
FIG. 1 a rear view of a solenoid actuator according to this invention.

Referring to FIG. 1, the case 9 is formed in a cylindrical shape. An axial end of the case 9 is closed by a bottom 93 thereof. Another end of the case 9 is open, and fixed to hydraulic equipment such as a valve via a pair of flange parts 91 which extend laterally on both sides of the opening of the case 9. For this purpose, a bolt hole 98 is formed on each of the flange parts 91, and the solenoid actuator 1 is fixed to the hydraulic equipment by bolts penetrating the bolt holes 98.

Referring again to FIG. 2, the solenoid assembly 10 comprises a bobbin 11 formed in a cylindrical shape having a hollow portion with flanges at both ends, a coil 12 wound on the bobbin 11, a pair of terminals 13 electrically connected to either end of the coil 12, and a molding resin 14 that wraps the bobbin 11, the coil 12, and the terminals 13.

The molding resin 14 comprises a wrapping portion 16 which wraps the bobbin 11 and the coil 12, and a connector portion 15 projecting from a tip of the wrapping portion 16 in a radial direction and having an opening. The pair of terminals 13 project radially from the bobbin 11 into the connector portion 15. A connector of a power cable is inserted into the connector portion 15 so as to be connected to the terminals 13 on the inside of the connector portion 15. It is also possible to supply electric power to the coil 12 using a lead wire without providing the pair of terminals 13. The connector portion 15 projects radially from the case 9 via a cutout 97 formed in the case 9.

By supplying electric power to the coil 12, the coil 12 is energized and generates a magnetic flux around the coil 12.

The case 9, a base 2, the plunger 4, and a sleeve 3 function as magnetic path forming members to transfer the magnetic flux generated by the energized coil 12. All of these members are made of magnetic material.

In FIGS. 1 and 2, the flange parts 91 are formed on an orthogonal plain to the center axis O. The connector portion 15 projects from the case 9 in an orthogonal direction to the center axis O.

The projecting direction of the flange parts 91 and that of the connector portion 15 may be modified depending on the shape of the hydraulic equipment to which the solenoid actuator 1 is fixed. For example, the connector portion 15 may project along the center axis O such that the connector of the power cable is inserted into the connector portion 15 in parallel with the center axis O.

The base 2 and the sleeve 3 are respectively formed in a cylindrical shape. The base 2 and the sleeve 3 are disposed in the case 9 coaxially with the center axis O. The base 2 is disposed on the hydraulic equipment side of the case 9 and the sleeve 3 is disposed on the bottom 93 side of the case 9.

A flange 21 is formed in the base 2 so as to contact the hydraulic equipment. The flange 21 is fitted into a recess 94 formed in a tip of the case 9 so as to form a contact surface that contacts the hydraulic equipment and is continuous with the flange parts 91.

A ring-shaped step portion 92 is formed in the recess 94. The flange 21 is fitted into the recess by seating a rim 22 of the flange 21 on the ring-shaped step portion 92.

A ring-shaped step portion 24 is formed on an outer circumferential surface 23 of the flange 21. On an outer side of the recess 94, a ring-shaped groove is formed in the case 9 near by the flange 21 such that a tip of the case 9 between the recess 94 and the ring-shaped groove functions as a crimp portion 95. The crimp portion 95 is bent inwardly so as to grip the ring-shaped step portion 24, thereby preventing the base 2 from falling out of the case 9.

A tapered surface 45 inclined with respect to the center axis O is formed in a tip of the base 2 facing the sleeve 3. A front end face 35 of the sleeve 3 facing the tapered surface 45 is formed into a ring-shaped plain orthogonal to the center axis O. The base 2 and the sleeve 3 are disposed such that a space is provided between the tapered surface 45 and the front end face 35. The space between the tapered surface 45 and the front end face 35 serves as a magnetic gap with respect to formation of the magnetic field by the energized coil 12. It is also possible to form the front end face 35 into a tapered shape inclined with respect to the center axis O.

The magnetic flux generated inside the energized coil 12 is transferred to the case 9, the base 2, the plunger 4, and the sleeve 3. Since direct transfer of the magnetic flux between the base 2 and the sleeve 3 is interrupted by the magnetic gap formed there-between, the magnetic flux is transferred between the base 2 and the sleeve 3 via the plunger 4. By thus forming the magnetic gap, an adequate magnetic flux density passing through the plunger 4 is ensured.

The shape and the location of the magnetic gap may be set arbitrarily as long as a thrust causing the plunger 4 to stroke along the center axis O is generated by energizing the coil 12.

The magnetic gap is filled with a gap filler 6 made of a non-magnetic material. The gap filler 6 comes into contact with the tapered surface 45 of the base 2 and the front end face 35 of the sleeve 3 without a gap, thereby functioning as a metal seal member shutting off working oil communication between the interior and the exterior of a cylindrical body formed by the base 2, the gap filler 6, and the sleeve 3.

A rear end face 32 of the sleeve 3 contacts the bottom 93 of the case 9 without clearance. An O-ring 19 is gripped between the bobbin 11 of the solenoid assembly 10 and the flange 21 of the base 2. Similarly, another O-ring 19 is gripped between the bobbin 11 and the bottom 93 of the case 9. These O-rings 19 are housed in annular grooves formed respectively in the tips of the bobbin 11.

According to the above construction, a pressure vessel housing the plunger 4 and a part of the shaft 5 is formed by the base 2, the gap filler 6, the sleeve 3 and the case 9, and fitted in the hollow portion of the bobbin 11. Working oil flowing from the hydraulic equipment into the solenoid actuator 1 via a gap 56 between an outer circumferential surface 51 of the shaft 5 and an inner circumferential surface 26 of the base 2 stays in the pressure vessel and does not leak from the pressure vessel to the outside. Since the pressure vessel is tightly closed by the O-rings 19, the sealing function of the gap filler 6 may be omitted. If sealing by the gap filler 6 is not required, the space between the tapered surface 45 of the base 2 and the front end face 35 of the sleeve 3 may be left in the form of an unfilled gap.

An outer circumferential surface 31 of the sleeve 3 is fitted into an inner circumferential surface of the bobbin 11. An outer circumferential surface 25 of the base 2 is also fitted into the inner circumferential surface of the bobbin 11.

The shaft 5 projects towards the hydraulic equipment from a front end face 49 of the base 2 located on the opposite side of the base 2 to the tapered surface 45.

The shaft 5 is made of a non-magnetic material. The shaft 5 is supported by a first bearing 7 in the base 2 and a second bearing 8 in the sleeve 3 so as to be free to slide along the center axis O. The plunger 4 is located between the first bearing 7 and the second bearing 8. The first bearing 7 and the second bearing 8 are made of non-magnetic material.

The sleeve 3 comprises a small-diameter inner circumferential surface 33 in the vicinity of the bottom 93 and a large-diameter inner circumferential surface 34 continuous with an inner circumferential surface of the gap filler 6. An outer circumferential surface 81 of the second bearing 8 is supported by the small diameter inner circumferential surface 33.

The base 2 comprises the above-described inner circumferential surface 26 and inner circumferential surface 27-29 having diameters which increase in a step by step fashion towards the tapered surface 45.

The inner circumferential surface 26 having the smallest diameter covers the outer circumferential surface 51 of the shaft 5 with the gap 56 as described above. The inner circumferential surface 27 having the second smallest diameter supports an outer circumferential surface 71 of the first bearing 7. The inner circumferential surface 29 is formed to have an identical diameter to the large diameter inner circumferential surface 34 of the sleeve 3 and the inner circumferential surface of the gap filler 6. The plunger 4 is housed in a cylindrical wall formed by the large-diameter inner circumferential surface 34 of the sleeve, the inner circumferential surface of the gap filler 6, and the inner circumferential surface 29 of the base 2.

The inner circumferential surface 28 having the third smallest diameter is formed between the inner circumferential surface 29 having the largest diameter and the inner circumferential surface 27 having the second smallest diameter in the base 2.

Figure 3:
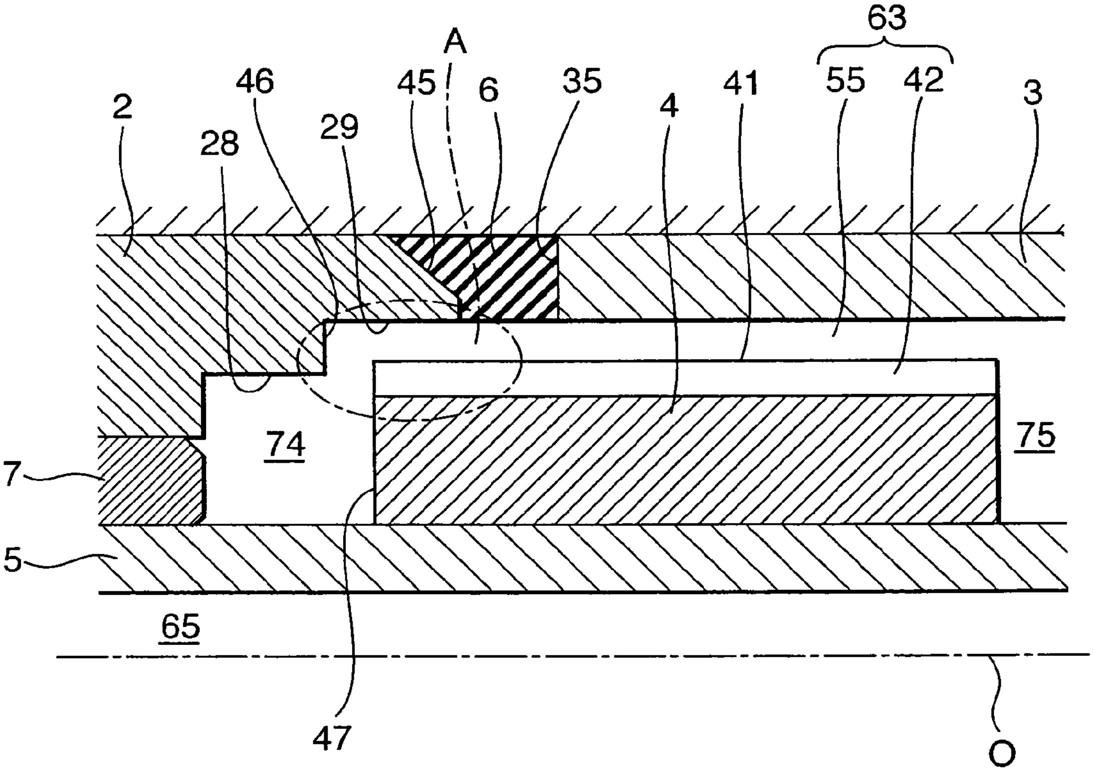
FIG. 3 an enlarged longitudinal sectional view of a plunger and peripheral parts in the solenoid actuator.

Referring to FIG. 3, a magnetically attracting surface 46 which attracts the plunger 4 by a magnetic force of the energized coil 12 is formed in the base 2. The magnetically attracting surface 46 corresponds to a ring-shaped step portion formed between the inner circumferential surface 28 and the inner circumferential surface 29.

The magnetically attracting surface 46 forms an orthogonal plain to the center axis O of the shaft 5. The diameter of the inner circumferential surface 28 is set to be smaller than a diameter of the plunger 4 such that the magnetically attracting surface 46 faces a front end face 47 of the plunger 4.

Referring again to FIG. 2, in the above-described pressure vessel formed by the base 2, the gap filler 6, the sleeve 3, and the case 9, a first bearing front chamber 73, a plunger front chamber 74, a plunger rear chamber 75, and a second bearing rear chamber 76 are formed facing the shaft 5 and/or the plunger 4. All of these chambers 73-76 are filled with working oil led from the hydraulic equipment. With respect to the name of these chambers, "front" denotes hydraulic equipment side and "rear" denotes an opposite side.

The first bearing front chamber 73 is formed in the inner circumferential surface 27 in front of the first bearing 7. The first bearing front chamber 73 is connected to the gap 56. The gap 56 forms a base oil passage 62 which connects the hydraulic equipment and the first bearing front chamber 73. It is possible to design the base oil passage 62 to store contaminants by making the inner circumferential surface 26 of the base 2 delimiting the gap 56 have a larger diameter such that the base oil passage 62 has a larger cross-sectional area.

The plunger front chamber 74 is formed between the first bearing 7 and the front end face 47 of the plunger 4. The plunger front chamber 74 corresponds to the interior of the inner circumferential surface 28 and a front portion of the inner circumferential surface 29. The first bearing 7 does not have an oil passage, and therefore working oil communication between the first bearing front chamber 73 and the plunger front chamber 74 is interrupted by the first bearing 7.

The plunger rear chamber 75 is formed between a rear end face 48 of the plunger 4 and the second bearing 8 in the interior of the inner circumferential surface 29.

The plunger front chamber 74 and the plunger rear chamber 75 are separated by the plunger 4. An annular gap 55 is provided between the inner circumferential surface 29 and an outer circumferential surface 41 of the plunger 4 so that the plunger 4 is not caused to contact the sleeve 3 by the magnetic force. The gap 55 forms a plunger exterior oil passage 63 which connects the plunger front chamber 74 and the plunger rear chamber 75.

A plurality of grooves 42 are formed in the outer circumferential surface 41 of the plunger 4 in parallel with the center axis O as a part of the plunger exterior oil passage 63. Working oil flows between the plunger front chamber 74 and the plunger rear chamber 75 via the plunger exterior oil passage 63 thus constructed.

By forming the plurality of grooves 42 in the outer circumferential surface 41 of the plunger 4, a width of the gap 55 can be narrowed without decreasing the flow cross-sectional area of the working oil. Narrowing the gap 55 improves a driving efficiency of the plunger 4.

The second bearing rear chamber 76 is formed between the second bearing 8 and the bottom 93 of the case 9 in the interior of the inner circumferential surface 33.

A plurality of grooves 82 are formed in the outer circumferential surface 81 of the second bearing 8 in parallel with the center axis O. The grooves 82 form a second bearing oil passage 64 connecting the plunger rear chamber 75 to the second bearing rear chamber 76.

A longitudinal through-hole 53 penetrates the shaft 5 in a direction of the center axis O. A lateral through-hole 54 which is orthogonal to the center axis O penetrates a projecting portion 52 of the shaft 5 projecting from the base 2. The longitudinal through-hole 53 and the lateral through-hole 54 form a shaft-penetrating oil passage 65 connecting the hydraulic equipment to the second bearing rear chamber 76.

An opening of the longitudinal through-hole 53 formed in the projecting portion 52 is closed by the hydraulic equipment when the solenoid actuator 1 is attached to the hydraulic equipment. The lateral through-hole 54 is however exposed to the interior of the hydraulic equipment when the solenoid actuator 1 is attached to the hydraulic equipment.

When the solenoid actuator 1 is attached to the hydraulic equipment, the solenoid actuator 1 is filled with working oil in the following manner.

- working oil from the hydraulic equipment fills the first bearing front chamber 73 via the base oil passage 62;
- working oil from the hydraulic equipment fills the second bearing rear chamber 76 via the shaft-penetrating oil passage 65;
- working oil in the second bearing rear chamber 76 fills the plunger rear chamber 75 via the second bearing oil passage 64; and
- working oil in the plunger rear chamber 75 fills the plunger front chamber 74 via the plunger exterior oil passage 63.

The solenoid actuator 1 drives the plunger 4 by the magnetic force generated by the coil 12 such that the shaft 5 fixed to the plunger 4 is driven axially.

When the coil 12 is not energized, the shaft 5 is kept in a retreated position by a reaction force of the hydraulic equipment. The retreated position herein corresponds to an initial position of the shaft 5.

When the coil 12 is energized, the plunger 4 is attracted towards the magnetically attracting surface 46 by an effect of the magnetic field formed in the interior of the coil 12. The thrust generated by the magnetic field causes the plunger 4 to move towards the magnetically attracting surface 46, thereby driving the shaft 5 forward to operate the hydraulic equipment. The operation of the hydraulic equipment denotes, for example, opening/closing of a valve. FIG. 2 shows a state where the shaft 5 has stroked forward slightly from the initial position.

When the plunger 4 strokes forward together with the shaft 5, working oil corresponding to the volume of the shaft 5 which withdraws from the second bearing rear chamber 76 flows into the second bearing rear chamber 76 from the hydraulic equipment via the shaft-penetrating oil passage 65.

Further, working oil corresponding to the stroke volume of the plunger 4 moves from the contracting plunger front chamber 74 to the expanding plunger rear chamber 75 via the plunger exterior oil passage 63.

When energization of the coil 12 is stopped, the shaft 5 strokes rearward due to the reaction force of the hydraulic equipment, which is the opposite way to the direction in which the shaft 5 is driven by the energized coil 12.

As the shaft 5 strokes rearward, the invasion volume of the shaft 5 into the second bearing rear chamber 76 is expelled from the second bearing rear chamber 76 to the hydraulic equipment via the shaft-penetrating oil passage 65.

Further, as the plunger 4 strokes rearward, working oil corresponding to the stroke volume of the plunger 4 moves from the contracting plunger rear chamber 75 to the expanding plunger front chamber 74 via the plunger exterior oil passage 63.

It should be noted that working oil led to the solenoid actuator 1 from the hydraulic equipment contains contaminants such as abrasion powder produced in the hydraulic equipment. Magnetic material such as iron powder contained in the working oil tends to be deposited on a strong magnetic field portion A shown in FIG. 3, where the magnetic flux between the base 2 and the plunger 4 concentrates, when the working oil flows into the plunger front chamber 74 and the plunger rear chamber 75 of the solenoid actuator 1. If a large amount of contaminant is deposited on a surface of the base 2 and the plunger 4 which form the strong magnetic field portion A, the following inconveniences will arise.

- the hysteresis of the solenoid actuator 1 increases due to a variation in the thrust generated by the energized coil 12; and
- the sliding resistance of the plunger 4 increases and the stroke length of the plunger 4 shortens.

To prevent these inconveniences from arising, this invention interrupts working oil communication between the first bearing front chamber 73 and the plunger front chamber 74 using the first bearing 7 while leading working oil from the hydraulic equipment into the plunger front chamber 74 via the shaft-penetrating oil passage 65, the second bearing rear chamber 76, the second bearing oil passage 64, the plunger rear chamber 75, and the plunger exterior oil passage 63.

According to this arrangement of the working oil path, the contaminant in the working oil has to travel along a long path before reaching the strong magnetic field portion A formed around the plunger 4. As a result, contaminant deposits on the strong magnetic field portion A of the surface of the base 2 and the plunger 4, which are made of magnetic material, are suppressed. Contaminant deposits on the strong magnetic field portion A are preferably suppressed to prevent a malfunction of the solenoid actuator 1 caused by the contaminant deposits.

The second bearing rear chamber 76 and the plunger rear chamber 75 which undertake expansion/contraction in response to the stroke of the plunger 4 are connected via the second bearing oil passage 64. Pressure variation in the hydraulic equipment is transmitted to the second bearing rear chamber 76, and then transmitted to the plunger rear chamber 75 via the second bearing oil passage 64.

With this pressure transmitting structure, a pressure difference between the second bearing rear chamber 76 and the plunger rear chamber 75 is unlikely to occur. Accordingly, a shift of the second bearing 8 due to a difference in pressures acting on both sides thereof is prevented from occurring.

The annular gap 55 provided around the outer circumferential surface 41 of the plunger 4 as the plunger exterior oil passage 63 prevents the plunger 4 driven by the magnetic force from contacting the sleeve 3. The plurality of grooves 42 formed in the outer circumferential surface 41 of the plunger 4 suppresses the flow rate of the working oil around the plunger 4 from increasing when the plunger 4 strokes, thereby decreasing viscous resistance which the working oil exerts on the stroke of the plunger 4 and enabling a high-speed stroke of the plunger 4. As a result, the response of the solenoid actuator 1 is increased. By causing the plunger 4 to stroke at a high speed, removal of contaminant deposited on the plunger 4 is also promoted and an environment is realized in which a malfunction of the solenoid actuator 1 due to a contaminant deposit is unlikely to occur.

Figure 4:
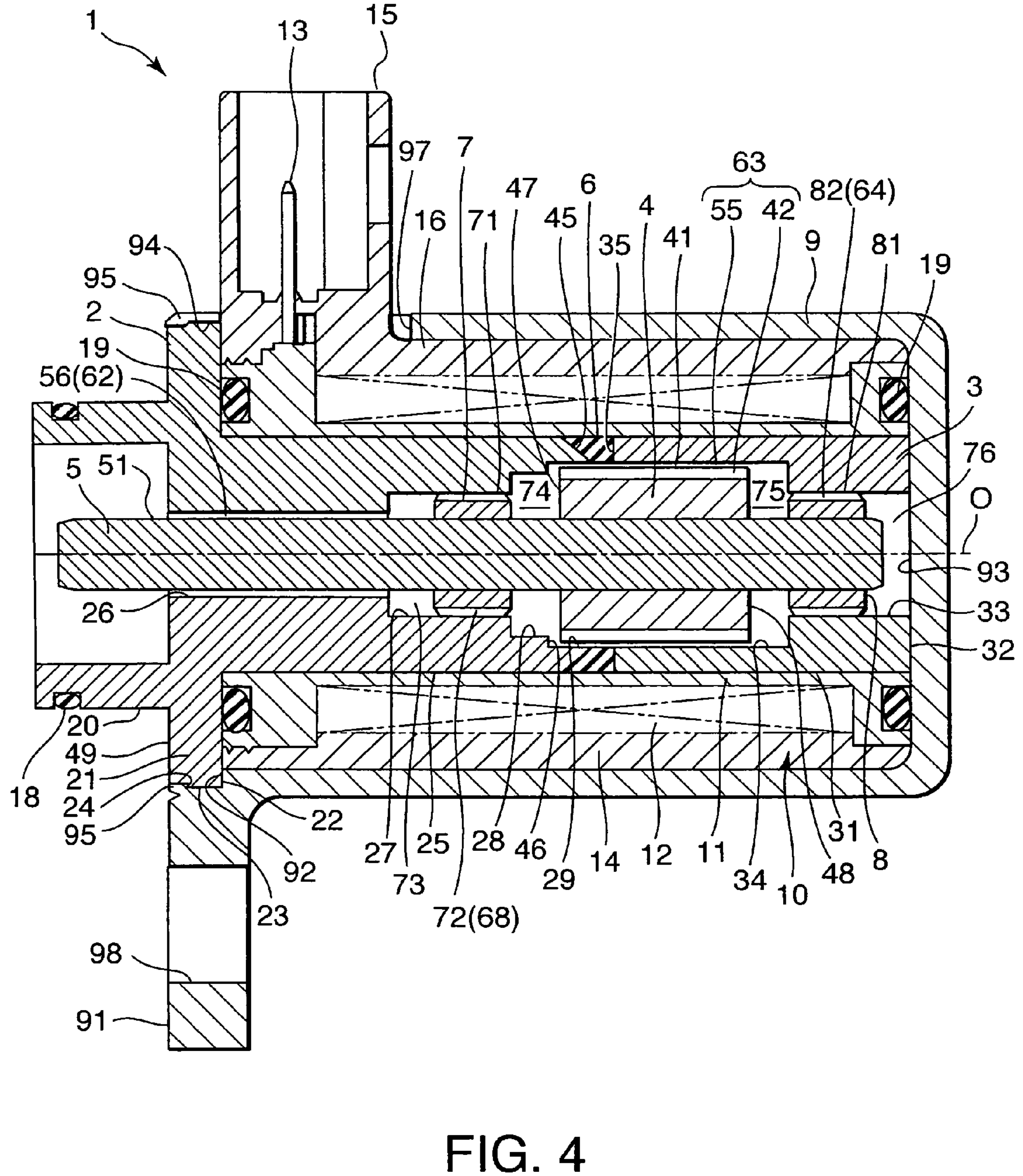
FIG. 4 is similar to FIG. 3, but shows a second embodiment of this invention.

Referring to FIG. 4, a second embodiment of this invention will be described.

Components of this embodiment that have the same construction as those of the first embodiment shown in FIGS. 1-3 are given identical component numbers and their description is herein omitted.

In a solenoid actuator 1 according to this embodiment, the shaft 5 is made of a solid material and the shaft-penetrating oil passage 65 constituted by the lateral through-hole 54 and the longitudinal through-hole 53 of the first embodiment is not provided.

A plurality of grooves 72 are formed on the outer circumferential surface 71 of the first bearing 7 in parallel with the center axis O. The grooves 72 forms a first bearing oil passage 68 connecting the first bearing first bearing front chamber 73 to the plunger front chamber 74.

A cylindrical part 20 projecting from the flange 21 towards the hydraulic equipment is formed on the base 2. The cylindrical part 20 is fitted into a fitting hole of the hydraulic equipment. An O-ring 18 is fitted onto an outer circumferential surface of the cylindrical part 20. The O-ring 18 prevents working oil from leaking from a fitting clearance between the fitting hole of the hydraulic equipment and the cylindrical part 20.

When the solenoid actuator 1 is attached to the hydraulic equipment, the solenoid actuator 1 is filled with working oil in the following manner.

- working oil from the hydraulic equipment fills the first bearing front chamber 73 via the base oil passage 62;
- working oil in the first bearing front chamber 73 fills the plunger front chamber 74 via the first bearing oil passage 68;
- working oil in the plunger front chamber 74 fills the plunger rear chamber 75 via the plunger exterior oil passage 63; and
- working oil in the plunger rear chamber 75 fills the second bearing rear chamber 76 via the second bearing oil passage 64.

The solenoid actuator 1 drives the plunger 4 using the magnetic force generated by the coil 12 such that the shaft 5 fixed to the plunger 4 is driven axially as in the case of the first embodiment.

When the plunger 4 strokes forward together with the shaft 5, working oil corresponding to the volume of the shaft 5 which withdraws from the second bearing rear chamber 76 flows from the hydraulic equipment to the second bearing rear chamber 76 via the base oil passage 62, the first bearing front chamber 73, the first bearing oil passage 68, the plunger front chamber 74, the plunger exterior oil passage 63, the plunger rear chamber 75, and the second bearing oil passage 64.

Further, when the plunger 4 strokes forward, working oil corresponding to the stroke volume of the plunger 4 moves from the contracting plunger front chamber 74 to the expanding plunger rear chamber 75 via the plunger exterior oil passage 63.

When energization of the coil 12 is stopped, the shaft 5 strokes rearward, i.e. in an opposite direction to the driving direction of the shaft 5 by the energized coil 12, due to the reaction force of the hydraulic equipment.

As the shaft 5 strokes rearward, the invasion volume of the shaft 5 into the second bearing rear chamber 76 is expelled from the second bearing rear chamber 76 to the hydraulic equipment via the second bearing oil passage 64, the plunger rear chamber 75, the plunger exterior oil passage 63, the plunger front chamber 74, the first bearing oil passage 68, the first bearing front chamber 73, and the base oil passage 62.

Further, as the plunger 4 strokes rearward, working oil corresponding to the stroke volume of the plunger 4 moves from the contracting plunger rear chamber 75 to the expanding plunger front chamber 74 via the plunger exterior oil passage 63.

According to this embodiment, the entire working oil flow accompanying an enlargement of the second bearing rear chamber 76 passes through the plunger exterior oil passage 63. Accordingly, when the stroke speed of the shaft 5 is constant, the flow velocity of the working oil in the plunger exterior oil passage 63 becomes higher than in the case of the first embodiment. High-speed working oil in the plunger exterior oil passage 63 promotes the removal of contaminant deposited on the outer circumferential surface 41 of the plunger 4. As a result, an operation failure of the solenoid actuator 1 due to a contaminant deposit is unlikely to occur.

The contents of Tokugan 2008-285371, with a filing date of Nov. 6, 2009 in Japan, and Tokugan 2008-301111, with a filing date of November 26 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

The embodiments of this invention in which an exclusive property or privilege is claimed are defined as follows:

What is claimed is:

1. A solenoid actuator attached to hydraulic equipment, comprising:

- a shaft connected to the hydraulic equipment, the shaft having a center axis;
- a plunger made of a magnetic material and fixed to the shaft;
- a coil which magnetically drives the plunger in a direction of the center axis;
- a first bearing and a second bearing which support the shaft, the first bearing and the second bearing being located on either side of the plunger in the direction of the center axis such that the first bearing is nearer to the hydraulic equipment than the second bearing;
- a plunger front chamber formed between the first bearing and the plunger;
- a plunger rear chamber formed between the plunger and the second bearing;
- a plunger exterior oil passage formed on the outside of the plunger to connect the plunger front chamber and the plunger rear chamber;
- a communication passage connecting the hydraulic equipment and at least one of the plunger front chamber and the plunger rear chamber;
- a first bearing front chamber formed on a side of the first bearing opposite to the plunger front chamber;
- a second bearing rear chamber which is formed on a side of the second bearing opposite to the plunger rear chamber and enlarges/contracts according to a displacement of the shaft along the center axis;
- a bobbin supporting the coil and having a hollow portion; and
- a pressure vessel fitted in the hollow portion,
- wherein the plunger, the first bearing, and the second bearing are housed in the pressure vessel, and the first bearing front chamber the plunger front chamber the plunger rear chamber, the second bearing rear chamber, the plunger exterior oil passage, and the communication passage are formed in the pressure vessel, and the plunger exterior oil passage comprises a gap between an outer circumferential surface of the plunger and an inner circumferential surface of the pressure vessel.

2. The solenoid actuator as defined in claim 1, further comprising a case having a bottom surface for housing the pressure vessel, the bobbin, and the coil, wherein the pressure vessel comprises a sleeve that is made of a magnetic material in a cylindrical form and contacts the bottom surface, a base made of a magnetic material in a cylindrical form, the sleeve and the base being disposed in series along the center axis, the pressure vessel further including a gap filler made of a non-magnetic material and interposed between the sleeve and the base.

3. The solenoid actuator as defined in claim 1, wherein the plunger exterior oil passage further comprises a plurality of grooves formed on the outer circumferential surface of the plunger and in parallel with the center axis.

4. A solenoid actuator attached to hydraulic equipment, comprising:

- a shaft connected to the hydraulic equipment, the shaft having a center axis;
- a plunger made of a magnetic material and fixed to the shaft;
- a coil which magnetically drives the plunger in a direction of the center axis;
- a first bearing and a second bearing which support the shaft, the first bearing and the second bearing being located on either side of the plunger in the direction of the center axis such that the first bearing is nearer to the hydraulic equipment than the second bearing;
- a plunger front chamber formed between the first bearing and the plunger;
- a plunger rear chamber formed between the plunger and the second bearing;
- a plunger exterior oil passage formed on the outside of the plunger to connect the plunger front chamber and the plunger rear chamber;
- a communication passage connecting the hydraulic equipment and at least one of the plunger front chamber and the plunger rear chamber;
- a first bearing front chamber formed on a side of the first bearing opposite to the plunger front chamber; and
- a second bearing rear chamber which is formed on a side of the second bearing opposite to the plunger rear chamber and enlarges/contracts according to a displacement of the shaft along the center axis,
- wherein the communication passage comprises a shaft-penetrating oil passage penetrating the shaft in a direction of the center axis to introduce working oil from the hydraulic equipment to the second bearing rear chamber, and a second bearing oil passage formed in the second bearing to connect the plunger rear chamber and the second bearing rear chamber.

5. The solenoid actuator as defined in claim 4, wherein the communication passage further comprises a base oil passage formed on the outside of the shaft in a direction of the center axis to introduce working oil from the hydraulic equipment to the first bearing front chamber.

6. A solenoid actuator attached to hydraulic equipment, comprising:

- a shaft connected to the hydraulic equipment, the shaft having a center axis;
- a plunger made of a magnetic material and fixed to the shaft;
- a coil which magnetically drives the plunger in a direction of the center axis;
- a first bearing and a second bearing which support the shaft, the first bearing and the second bearing being located on either side of the plunger in the direction of the center axis such that the first bearing is nearer to the hydraulic equipment than the second bearing;
- a plunger front chamber formed between the first bearing and the plunger;
- a plunger rear chamber formed between the plunger and the second bearing;
- a plunger exterior oil passage formed on the outside of the plunger to connect the plunger front chamber and the plunger rear chamber;
- a communication passage connecting the hydraulic equipment and at least one of the plunger front chamber and the plunger rear chamber;

a first bearing front chamber formed on a side of the first bearing opposite to the plunger front chamber; and a second bearing rear chamber which is formed on a side of the second bearing opposite to the plunger rear chamber and enlarges/contracts according to a displacement of the shaft along the center axis, wherein the communication passage further comprises a base oil passage formed on the outside of the shaft in the direction of the center axis to introduce working oil from the hydraulic equipment to the first bearing front chamber, and a first bearing oil passage formed through the first bearing to connect the first bearing front chamber and the plunger front chamber.

7. The solenoid actuator as defined in claim 6, wherein the first bearing oil passage comprises a plurality of grooves formed on the outer circumferential surface of the first bearing and in parallel with the center axis.

* * * * *